(12) United States Patent
Richter et al.

(10) Patent No.: US 8,765,024 B2
(45) Date of Patent: Jul. 1, 2014

(54) FUNCTIONALIZED CARBON NANOTUBES EXHIBITING ENHANCED SOLUBILITY AND METHODS OF MAKING

(75) Inventors: Henning Richter, Newton, MA (US); Ramesh Sivarajan, Shrewsbury, MA (US)

(73) Assignee: Nano-C, Inc., Westwood, MA (US)

(*) Notice: Subject to any disclaimer, the term of this patent is extended or adjusted under 35 U.S.C. 154(b) by 0 days.

(21) Appl. No.: 13/330,616

(22) Filed: Dec. 19, 2011

(65) Prior Publication Data

US 2012/0261620 A1    Oct. 18, 2012

Related U.S. Application Data

(60) Provisional application No. 61/424,425, filed on Dec. 17, 2010.

(51) Int. Cl.
| | |
|---|---|
| H01B 1/06 | (2006.01) |
| H01B 1/24 | (2006.01) |
| C01B 31/02 | (2006.01) |
| B82Y 40/00 | (2011.01) |
| B82Y 30/00 | (2011.01) |

(52) U.S. Cl.
CPC .......... C01B 31/0273 (2013.01); B82Y 40/00 (2013.01); B82Y 30/00 (2013.01)
USPC .......................................... 252/510; 423/414

(58) Field of Classification Search
USPC ............... 423/445 R, 445 B, 414; 252/510
See application file for complete search history.

(56) References Cited

U.S. PATENT DOCUMENTS

| | | | | |
|---|---|---|---|---|
| 6,162,926 A | * | 12/2000 | Murphy et al. | ............... 548/417 |
| 7,883,685 B1 | * | 2/2011 | Afzali-Ardakani et al. | .. 423/461 |
| 2006/0223991 A1 | | 10/2006 | Zhang et al. | |

OTHER PUBLICATIONS

Puplovskis, A., et al., "New Route for [60]Fullerene Functionalization in [4+2] Cycloaddition Reaction Using Indene," Tetrahedron Letters, vol. 38, No. 2, pp. 285-288, 1997.*

Delgado, J., et al., "Microwave-assisted sidewall functionalization of single-wall carbon nanotubes by Diels-Alder cycloaddition," Chem. Commun., 2004, 1734-1735.*

Delgado, J. et al., "Microwave-Assisted Sidewall Functionalization of Single-Wall Carbon Nanotubes by Diels-Alder Cycloaddition," Chem. Communic.—ChemCom; Royal Society of Chemistry, GB, No. 15: 1734-1795 (Jan. 1, 2004).

(Continued)

*Primary Examiner* — Mark Kopec
*Assistant Examiner* — William Young
(74) *Attorney, Agent, or Firm* — Wilmer Cutler Pickering Hale and Dorr LLP

(57) ABSTRACT

Functionalized carbon nanotubes and dispersions containing functionalized carbon nanotubes are provided. Exemplary functionalized carbon nanotubes include optionally substituted indene-based moieties. Methods of making functionalized carbon nanotubes and dispersions containing functionalized carbon nanotubes are provided. Methods of making conductive carbon nanotube dispersions, including films, are provided. Such methods include heating carbon nanotubes in a solvent in the absence of externally applied energy, to obtain an adduct that includes the solvent moiety bound to the carbon nanotube. Where the solvent includes an indene-based compound, the carbon nanotube thus prepared includes optionally indene-based moieties bound to the carbon nanotubes.

19 Claims, 17 Drawing Sheets

(56) References Cited

OTHER PUBLICATIONS

Georgakilas V. et al., "Organic functionalization of carbon nanotubes," J. of Am. Chem. Soc., vol. 124(5): 760-761 (Feb. 6, 2002).

Holzinger, M. et al., "Sidewall Functionalization of Carbon Nanotubes," Angewandte Chemie, International Edition, Wiley VCH Verlag, Weinheim, vol. 40(21): 4002-4005 (Oct. 31, 2001).

International Search Report issued for PCT/US2011/065932, dated Apr. 5, 2012 (2 pages).

Strano, M. et al., "Electronic Structure Control of Single-Walled Carbon Nanotube Functionalization," Science, Am. Assoc. for the Advance of Science, Washington, D.C., vol. 301: 1519-1522 (Sep. 12, 2003).

Dai, L. et al., "Functionalized surfaces based on polymers and carbon nanotubes for some biomedical and optoelectronic applications," Nantechnol., vol. 14: 1081-1097 (2003).

* cited by examiner

9a

9b

FUNCTIONALIZED CARBON NANOTUBES EXHIBITING ENHANCED SOLUBILITY AND METHODS OF MAKING

CROSS REFERENCE TO RELATED APPLICATIONS

This application claims the benefit of U.S. patent application Ser. No. 61/424,425, filed Dec. 17, 2010.

FIELD

This application is directed to preparation of functionalized carbon nanotubes. In particular, this application is directed to methods of preparing functionalized carbon nanotubes having improved solubility properties.

BACKGROUND

Nanotubes are members of the fullerene structural family, which also includes the spherical buckyballs, and the ends of a nanotube may be capped with a hemisphere of the buckyball structure. Their name is derived from their long, hollow structure with the walls formed by one-atom-thick sheets of carbon, called graphene. These sheets are rolled at specific and discrete ("chiral") angles, and the combination of the rolling angle and radius decides the nanotube properties; for example, whether the individual nanotube shell is a metal or semiconductor. Nanotubes are categorized as single-walled nanotubes (SWCNT) and multi-walled nanotubes (MWNT). While single-walled carbon nanotubes consist of one single folded graphene sheet, multiple walled carbon nanotubes of multiple rolled layers (concentric tubes) of graphite.

Single-walled carbon nanotubes (SWCNT) are characterized by their unique mechanical, electrical and optical properties. The tensile strength of individual SWCNT can be well over 30 GPa and electrical conductance of metallic SWCNT ropes approach $10^6$ S/m. Formed after deposition of SWCNT dispersions, SWCNT networks also allow visible and infrared light transmission in the direction normal to the plane of the film. This property arises from the extremely small diameters (<1.5 nm average) of the SWCNT coupled with the huge aspect (i.e., length-to-diameter) ratio with typical values of 1000-1500. Thus, the formation of transparent conductive networks is possible. The combination of such properties in a single material marks them as distinctive candidates for a multitude of lab-demonstrated applications like field effect transistors, non-volatile memories, displays, touch screens, battery electrodes, supercapacitors and filtration membranes.

Emerging industrial applications for SWCNT include polymer composites with better strength performance (Coleman, J. N.; Khan, U.; Blau, W. J. and Gun'ko, Y. K., Small but strong: A review of the mechanical properties of carbon nanotube-polymer composites. *Carbon* 2006, 44, 1624-1652); allowing for new concepts in the aerospace industry, (Jacoby, M., Composite Materials. C & EN, Aug. 30, 2004, pp. 34-39); electronics (e.g., data storage, displays, sensors, thin film transistors) (Cao, Q. and Rogers, J. A., Ultrathin Films of Single-Walled Carbon Nanotubes for Electronics and Sensors: A Review of Fundamental and Applied Aspects. *Adv. Mater.* 2008, 20, 29-53) (Avouris, P., Carbon Nanotube Electronics and Photonics. *Physics Today* 2009, 34-40); batteries (Landi, B. J.; Ganter, M. J.; Schauerman, C. M.; Cress, C. D. and Raffaelle, R. P., Lithium Ion Capacity of Single Wall Carbon Nanotube Paper Electrodes. J. Phys. Chem. C 2008, 112, 7509-7515) (Pushparaj, V. L.; Shaijumon, M. M.; Kumar, A.; Murugesan, S.; Ci, L.; Vajtai, R.; Linhardt, R. J.; Nalamasu, O. and Ajayan, P. M., Flexible Energy Storate Devices Based on Nanocomposite Paper. *Proc Natl Acad Sci USA* 2007,101,13574-13577); supercapacitors; filter membranes for the removal of viral and bacterial pathogens (Brady-Estevez, A. S.; Kang, S. and Elimelech, M., A Single-Walled-Carbon-Nanotube-Filter for Removal of Viral and Bacterial Pathogens. *Small* 2008, 4, 481-484); detection of chemical and biological species (Heller, D. A.; Jin, H.; Martinez, B. M.; Patel, D.; Miller, B. M.; Yeung, T.-K.; Jena, P. V.; Höbartner, C.; Ha, T.; Silverman, S. K. and Strano, M. S., Multimodal Optical Sensing and Analyte Specificity using Single-Walled Carbon Nanotubes. *Nature Nanotechnology* 2009, 4, 114-120); including potential warfare agents (Lee, C. Y.; Sharma, R.; Radadia, A. D.; Masel, R. I. and Strano, M. S., On-Chip Micro Gas Chromatograph Enabled by a Non-covalently Functionalized Single-Walled Carbon Nanotube Sensor Array. *Angew. Chem. Int. Ed.* 2008, 47, 5018-5021); and transparent conducting electrodes (Eikos, Inc., 2009, www.eikos.com) (Unidym, Inc., 2009, www.unidym.com), e.g., for LCDs, touch screens, and flexible solar cells (Contreras, M. A.; Barnes, T.; van de Lagemaat, J.; Rumbles, G.; Coutts, T. J.; Weeks, C.; Glatkowski, P.; Levitsky, I.; Peltola, J. and Britz, D., Replacement of Transparent Conductive Oxides by Single-Wall Carbon Nanotubes in Cu(In, Ga)Se$_2$-Based Solar Cells. *J. Phys. Chem. C* 2007, 111, 14045-14048). Despite the great potential across sectors and applications, announcements of the commercialization of sensors (Halford, B., Carbon Nanotube Electronics Power Up. C&EN, Jan. 3, 2005, p. 27) and the presentation of prototypes of field effect displays and flat panel TV screens (Kanellos, M. Carbon TVs to Edge out Liquid Crystal, Plasma? NEWS. COM, 01/05/2005), there is no evidence of significant use of SWCNT at industrial scale. However, previous predictions (Frost & Sullivan, An Assessment on the Future of Carbon Nanotubes—Strategic of the Market and Potential. June 2004) of a dramatic market growth from less than one million dollars in 2001 to $200 million in 2007 have not materialized. Enabling the broad use of SWCNT requires their availability in a form which allows their easy addition and sufficiently homogeneous mixing with hosts such as other chemicals or homogenous deposition on substrates without loosing or able to recover beneficial properties of SWCNT such as mechanical strength or electrical conductivity.

A major limitation of the chemical modification of carbon nanotubes is their very limited solubility in organic solvents, which does not allow for homogeneous solution-based reactions, which are necessary for commercial and industrial applications of nanotubes. Accordingly, there is a need for a solution that will improve the ability to utilize nanotubes without sacrificing their beneficial properties.

Carbon nanotubes possess unique properties making them useful, among others, for the enhancement of electrical, but also thermal conductivity. Of particular interest is maintaining optical transparency (e.g., the absence of absorption and also scattering) for electromagnetic waves of targeted wavelengths while achieving high electrical conductivity. Transparent conducting electrodes for photovoltaic (and other) devices are only one example for which such properties are critical. However, to take advantage of these unique properties, miscibility with or dispersibility in a range of hosts is necessary. Mechanical mixing in the solid state has been used to utilize the carbon nanotubes, but usually does not allow for sufficient mixing at the nanoscale level as van der Waals force based attraction between individual SWCNT (leading to bundles) is often stronger than attractive forces between SWCNT and the host. Surfactants such as, but not limited to, sodium cholate and sodium dodecyl sulfate (SDS), can wrap around individual SWCNT and break the bundling forces, e.g., leading to debundling, also called exfoliation. However, to achieve this result significant quantities of surfactant are required, which often negatively affect the characteristics of the resulting mixture. Liquid dispersions of carbon nanotubes have also been attempted. In some cases, liquid dispersions have been achieved by at least partially exfoliating (e.g., debundling) individual carbon nanotubes.

After their formulation, such carbon nanotube dispersions can be either mixed with solutions of other materials, e.g., polymers of which electrical conductivity is intended to be increased, or deposited on substrates using established coating techniques such as dip- and spray-coating or inkjet printing.

However, carbon nanotubes are, at best, only poorly soluble in almost all known solvents. In many cases, carbon nanotubes are not soluble at all, e.g., no visible coloration can be achieved after precipitation of the added SWCNT, consistent with a concentration of <0.01 mg/mL. As a result, solubility enhancement is necessary.

Chemical functionalization is another route to achieve enhanced solubility in selected solvents. The type of the functional group will affect the identity of the solvent that is suitability for creating a dispersion. Functionalization strategies are generally divided into two different approaches (e.g., X. Peng and S. S. Wong, Adv. Mater. 2009, 625-642). In the first approach, oxygenated chemical groups such as carboxylic acid (—COOH) are introduced onto the tips and defect sites of nanotube surfaces by treatment with nitric acid ($HNO_3$). Amidation and esterification are used for the subsequent linking of molecular moieties such as alkyl chains, polyethylene glycol, aromatic species or bio-inspired moieties. In the second approach, covalent sidewall reactions are carried out on the nanotube surface. Polar, pericyclic as well as radical reactions are used to construct carbon-carbon and carbon-heteroatom bonds on the surface of carbon nanotubes. Examples of organic functionalization strategies include [2+1] cycloadditions of nitrenes and carbenes, 1,3-dipolar cycloadditions of azomethine ylides and reactions with diazonium compounds.

While reactions are often similar to those of $C_{60}$ and $C_{70}$ fullerenes, differences exist. For example, [4+2] cycloadditions such as the Diels-Alder cycloaddition of o-quinodimethane has been reported. However, unlike the reaction with $C_{60}$ (Belik et al., Angew. Chem. Int. Ed. Engl. 1993, 32, 78-80), microwave radiation was required. Similarly, cyclopropanation of malonic acid derivatives could be carried with fullerenes (C. Bingel, Chem. Ber. 1993, 126, 1957-1959.) and ultrashort (20 to 80 nm) carbon nanotubes under mild conditions, whereas microwave-assistance was necessary for longer tubes.

SUMMARY

A new inexpensive and scalable functionalization method for carbon nanotubes is provided. In one aspect, indene is added by Diels-Alder reaction to both as-produced and purified carbon nanotubes to provide a well-dispersed carbon nanotube at high concentration. In certain embodiments, a [4+2] Diels-Alder reaction is conducted using the reactant as solvent, i.e., the latter being in large excess. In other embodiments, the Diels-Alder reactant is delivered via a solvent system. Drastically improved solubility in certain solvent systems, such as propylene-glycol-methyl-ether-acetate (PGMEA), ethanol and tetrahydrofuran (THF) has been observed. In one embodiment, a purification procedure based on the selective solubility of the functionalized carbon nanotubes in THF has been demonstrated.

In one aspect, a method of preparing functionalized carbon nanotubes is provided. The method includes heating a carbon nanotube in a solvent that includes an optionally substituted polycyclic aromatic compound in the absence of externally applied energy. The method is performed under conditions sufficient to obtain an adduct comprising the polycyclic aromatic moiety bound to the carbon nanotube.

In some embodiments, the optionally substituted polycyclic aromatic compound is an optionally substituted indene-based compound. In some embodiments, solvent is the indene-based compound. In other embodiments, the optionally substituted indene-based compound includes one or more functional groups selected from the group consisting of $C_1$-$C_{12}$ alkyl, $C_3$-$C_{12}$ alkenyl, $C_1$-$C_{12}$ alcohol, halogen, metal halide, carboxylic acid, ester, ether, polyethyleneglycol, —$NH_2$, NHR, —CONH, —$SO_3$H, ketone, aldehyde, optionally substituted phenyl, optionally substituted benzyl, and mixtures thereof, or where the optionally substituted indene-based compound is fused with one or more additional aromatic rings. In these embodiments, where R is $C_1$-$C_{12}$ alkyl, $C_3$-$C_{12}$ alkenyl, halogen, or a mixture thereof. In further embodiments, the polycylic aromatic hydrocarbon includes optionally substituted naphthalene, phenanthrene, or anthracene.

In some embodiments, the heating step of the method of preparing functionalized carbon nanotubes includes refluxing the carbon nanotube in the solvent or melting the carbon nanotube in the solvent. For example, in some embodiments, refluxing is provided where the reactants (solvent and aromatic compound) are liquid at room temperature. In other embodiments, melting is provided where at least one of the reactants is solid at room temperature.

In some embodiments, the carbon nanotubes are purified prior to the reaction that produces functionalized carbon nanotubes. In other embodiments, the carbon nanotubes are greater than 95% pure. In further embodiments, the carbon nanotubes are at least 70% pure.

In another aspect, a stable carbon nanotube dispersion is provided. The dispersion includes a population of functionalized carbon nanotubes and a solvent. In some embodiments, the functionalized carbon nanotube includes an optionally-substituted indene-based moiety. In some embodiments, the solvent of the dispersion includes water, THF, PGMEA, alcohol (e.g., methanol and ethanol), hexane, benzene, toluene, xylenes, chlorobenzene, or mixtures thereof In some embodiments, the disclosed stable carbon nanotube dispersions have a carbon nanotube content greater than 1.5 mg/mL. In other embodiments, the carbon nanotube dispersions have a carbon nanotube content greater than 1.6 mg/mL.

In a further aspect, a method of preparing the stable carbon nanotube dispersion described above is disclosed. The method includes providing a population of functionalized carbon nanotubes and dispersing the population of carbon nanotubes in a solvent. In some embodiments, the solvent includes water, THF, PGMEA, alcohol (e.g., methanol and ethanol), hexane, benzene, toluene, xylenes, chlorobenzene, or mixtures thereof. In some embodiments, the stable carbon nanotube dispersion is prepared by sonication of the functionalized carbon nanotubes in the solvent.

In further embodiments, the method of preparing the stable carbon nanotube dispersion also includes a step of isolating the functionalized carbon nanotubes from the solvent by extraction or leaching. In some embodiments, the extraction is solid-liquid extraction (e.g., Soxhlet extraction), while in other embodiments, the extraction is liquid-liquid extraction.

In yet another aspect, a functionalized carbon nanotube is provided that includes a carbon nanotube and at least one indene-based functional group covalently bound to the carbon nanotube. In some embodiments, the at least one indene-based functional group is optionally substituted with up to four chemical moieties covalently bound to the six-membered ring of the indene-based functional group. In some embodiments, the chemical moieties independently include $C_1$-$C_{12}$ alkyl, $C_3$-$C_{12}$ alkenyl, $C_1$-$C_{12}$ alcohol, halogen, metal halide, carboxylic acid, ester, ether, polyethyleneglycol, —$NH_2$, NHR, —CONH, —$SO_3H$, ketone, aldehyde, optionally substituted phenyl, optionally substituted benzyl, and mixtures thereof. In these embodiments, R is $C_1$-$C_{12}$ alkyl, $C_3$-$C_{12}$ alkenyl, halogen, or a mixture thereof. In some embodiments, the functionalized carbon nanotube is prepared by refluxing the carbon nanotube in an indene-based solvent in the absence of externally applied energy, to obtain an adduct comprising the indene based solvent bound to the carbon nanotube.

In one aspect, a method of making a conductive carbon nanotube is provided. The method includes (a) reacting a plurality of carbon nanotubes with an optionally substituted indene-based compound under conditions sufficient to produce a plurality of indene-carbon nanotube adducts;(b) dispersing the plurality of indene-carbon nanotube adducts in a solvent; (c) applying the indene-carbon nanotube adduct dispersion to a substrate; and (d) heating the substrate containing the indene-carbon nanotube adduct under conditions sufficient to increase the electrical conductivity. In some embodiments, the electrical conductivity is increased by at least 30%, by at least 40%, or by at least about 50%. In some embodiments, the conductive carbon nanotube forms a conductive film.

In some embodiments, the method includes the step of removing the solvent prior to the step of heating the substrate.

In a further aspect, a method of separating a population including a plurality of semiconducting nanotubes and a plurality of metallic nanotubes is provided. The method includes selectively functionalizing one of the plurality of semiconducting nanotubes or the plurality of metallic nanotubes, and separating the plurality of semiconducting nanotubes from the plurality of metallic nanotubes based on the presence of functional groups (e.g., based on differences in the chemical properties of the functional groups compared to the non-functionalized nanotubes). In some embodiments, the step of selectively functionalizing comprises refluxing a population of nanotubes in an indene-based solvent in the absence of externally applied energy, to obtain an adduct that includes the indene based solvent selectively bound to one of the plurality of semiconducting nanotubes or the plurality of metallic nanotubes. In some embodiments, the separating step includes selective extraction or leaching of one of the plurality of semiconducting nanotubes or the plurality of metallic nanotubes. In some embodiments, the separating step comprises a solid-liquid extraction or liquid-liquid extraction.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
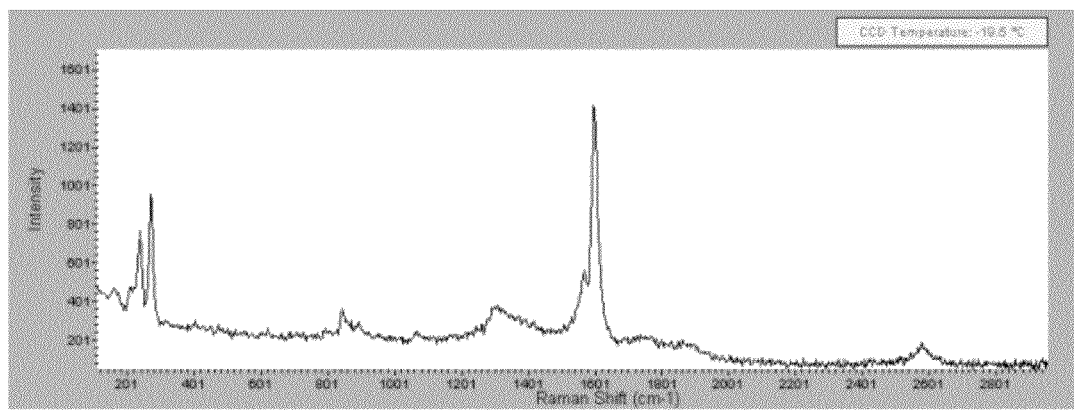
FIG. 1 is a representation of a Raman spectrum of indene-functionalized as-produced SWCNT, produced with an excitation wavelength of 785 nm.

The preparation of functionalized carbon nanotubes is described. Dispersions of the disclosed functionalized nanotubes are also described, as well as methods for preparing such dispersions.

In one embodiment, a method of preparing functionalized carbon nanotubes includes heating carbon nanotubes in an indene-based solvent. For example, in some embodiments, the heating step includes refluxing the carbon nanotubes in a solvent. In one embodiment, a Diels Alder reaction results in [4+2] addition product of the indene-based solvent with the nanotubes. A general reaction scheme for reaction of a carbon nanotube with indene or a functionalized indene according to one embodiment is shown in Scheme 1. In Scheme 1, the organic solvent is a common organic solvent in which the indene is soluble (such as toluene, xylene, chlorobenzene) or the reactant, e.g., indene or a functionalized indene. It has been surprisingly discovered that the disclosed methods successfully achieve functionalization of carbon nanotubes without the addition of externally applied energy in addition to heat (e.g., microwaves, UV irradiation or ultrasound). The method described here can be carried out in any laboratory, is easy to scale and does not require any complex or expensive equipment.

Scheme 1

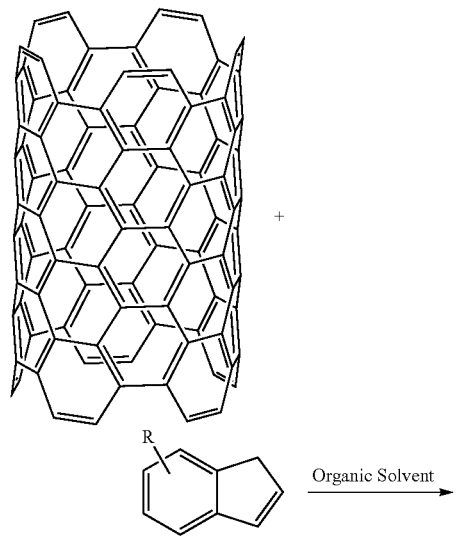

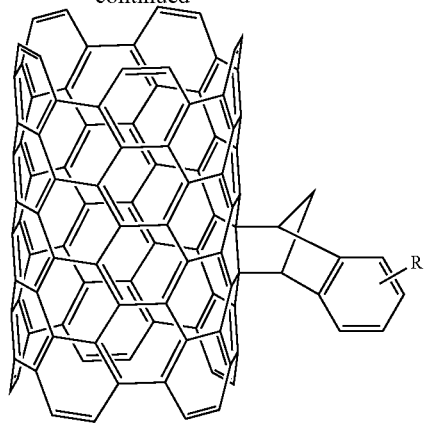

In some embodiments, the carbon nanotubes are single-walled carbon nanotubes. In other embodiments, the carbon nanotubes are multiwall carbon nanotubes. For example, in some nonlimiting embodiments, the nanotubes have at least two walls (i.e., double-walled). In other embodiments, the nanotubes have 3 to 12 walls. In further embodiments, the nanotubes have less than 12 walls. In yet another embodiment, the nanotubes have between 2 and 6 walls. In some embodiments, the carbon nanotubes have between 2 and 8 walls. In further embodiments, the carbon nanotubes have between 2 and 10 walls. In exemplary nonlimiting embodiments, the carbon nanotubes have 2, 4, 6, 8, 10 or 12 walls.

In another embodiment, mixtures of single and multi-walled carbon nanotubes are provided. For example, in some embodiments, a mixture of single and double walled nanotubes are provided. In further embodiments, a mixture of single nanotubes and multiwalled nanotubes is provided. In another embodiment, a mixture of multiple-walled carbon nanotubes is provided, in which the mixture includes nanotubes having various walled configurations.

In some embodiments, the reactant is a functionalized indene. In some embodiments, the functionalized indenes incorporate chemical functional groups (e.g., chemical moieties) covalently bound to the six-membered ring of the indene group. For example, in some nonlimiting embodiments, the indene group includes one chemical function group covalently bound to the six-membered ring of the indene group. In other nonlimiting embodiments, the indene group includes two chemical function group covalently bound to the six-membered ring of the indene group. In yet another nonlimiting embodiment, the indene group includes three chemical function group covalently bound to the six-membered ring of the indene group. In still further nonlimiting embodiments, the indene group includes four chemical function group covalently bound to the six-membered ring of the indene group (i.e., it is fully saturated with functional groups).

Exemplary functionalized indenes include, without limitation, indene that has been modified to include one or more of: $C_1$-$C_{12}$ alkyl, $C_3$-$C_{12}$ alkenyl, halogen (e.g., bromine, chlorine or fluorine), metal halides (e.g., magnesium halide), $C_1$-$C_{12}$ alcohol (e.g., —ROH), carboxylic acid (e.g., —COOH), ester (e.g., —COOR), ether (e.g., —OR), polyethyleneglycol, —$NH_2$, NHR, —CONH, —$SO_3$H, ketones (e.g., —COR), aldehydes (e.g., —CHO), phenyl, benzyl (e.g., —$CH_2$—$C_6H_5$), phenyl or benzyl bearing any of the other functionalized groups listed before or combinations between the previous functionalities. In some embodiments, R is $C_1$-$C_{12}$ alkyl, $C_3$-$C_{12}$ alkenyl, or halogen (e.g., bromine, chlorine or fluorine). In some nonlimiting embodiments, the R or functional group is $C_1$-$C_{12}$ alkyl (e.g., one or more of methyl, ethyl, propyl, isopropyl). In other nonlimiting embodiments, R or the functional group is $C_1$-$C_6$ alkyl. In further nonlimiting embodiments, R or the functional group is $C_3$-$C_8$ alkyl. The attachment of chemical groups to the six-membered ring in indene is conducted by means of well established reaction schemes allowing for the functionalization of aromatic rings such as Friedel-Crafts reactions (I). In other embodiments, Grignard reactions (II) are utilized to add aldehyde or ketone moieties via the carbonyl carbon of alkyl- or aryl-magnesium halides. In further embodiments, indenyl-magnesiun halides are formed by halogenation (e.g., reaction with $Br_2/FeBr_3$) followed by addition of magnesium.

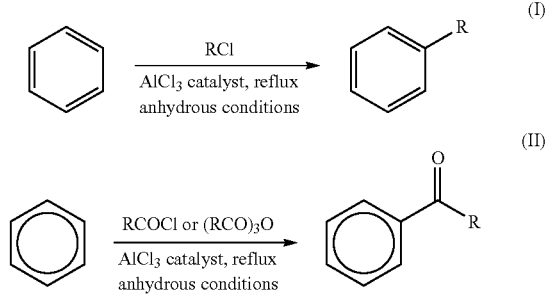

In other embodiments, the reactant is an indene fused with one or more additional aromatic rings. Nonlimiting examples of such additional aromatic rings include 5-8-atom optionally substituted aromatic rings. In another embodiment, the indene is fused with a non-aromatic saturated or partially unsaturated 5-8 atom unsubstituted or substituted ring. In a further embodiment, the indene is fused with a six-membered aromatic ring. Exemplary optional substitutions include, without limitation, $C_1$-$C_{12}$ alkyl, $C_3$-$C_{12}$ alkenyl, halogen (e.g., bromine, chlorine or fluorine), metal halides (e.g., magnesium halide), $C_1$-$C_{12}$ alcohol (e.g., —ROH), carboxylic acid (e.g., —COOH), ester (e.g., —COOR), ether (e.g., —OR), polyethyleneglycol, —$NH_2$, NHR, —CONH, —$SO_3H$, ketone (e.g., —COR), aldehyde (e.g., —CHO), phenyl, benzyl (e.g., —$CH_2$—$C_6H_5$, phenyl or benzyl bearing any of the other functionalized groups listed before or combinations between the previous functionalities). In some embodiments, R is $C_1$-$C_{12}$ alkyl, $C_3$-$C_{12}$ alkenyl, or halogen (e.g., bromine, chlorine or fluorine).

In some embodiments, reaction with an unfunctionalized or functionalized indene is conducted in a solvent such as toluene, chlorobenzene or dichlorobenzene (ortho- and/or para). Optionally substituted indene is present in the reaction mixture at a concentration of at least about 5%, at least about 10%, at least about 15%, at least about 25%, at least about 30%, at least about 50%.

In some embodiments, dispersions of functionalized nanotubes are achieved by heating carbon nanotubes in melts of solvents which are solid at room temperature, such as polycyclic aromatic hydrocarbons. Exemplary solvents include, without limitation, naphthalene, phenanthrene, and anthracene, pyrene and chrysene, to which indene-based reactives are added. In other embodiments, the indene-based reactant melts by heating and functions as solvent. Accordingly, in one embodiment, functionalization of the carbon nanotubes is achieved by melting polycyclic aromatic hydrocarbons in the presence of an indene-based reactant and carbon nanotubes.

As disclosed herein, the capability of functionalized purified carbon nanotubes to be dispersed in various solvents such as water, alcohol (e.g. methanol or ethanol), THF, and PGMEA has been demonstrated successfully. Extension to other solvents will be enabled by the attachment of additional functional groups to the reactant (used for the functionalization) prior to reaction. Solubilization of the functionalized carbon nanotube products in a range of solvents can be achieved by choosing suitable functional groups to be attached, taking into account, e.g., the degree of polarity of the both the solvent and attached functionalities. For instance, functionalization of the indene with alkyl groups ($C_nH_{2n+1}$) or alkenyl ($C_nH_{2n-1}$) with $n \geq 6$ will enhance the solubility in aliphatic solvents such as hexane. In other embodiments, attachment of indene bearing aromatic groups such as phenyl, naphthyl, anthracyl, phenantryl, pyrenyl or other substituted or unsubstituted polycyclic aromatic hydrocarbons leads to increased solubility in aromatic solvents such as benzene, toluene, xylenes, or chlorobenzene. Polyethylene glycol attached to the indene will allow for solubility in polar solvents, for instance water and methanol. Solubility will increase with the length of the polyethylene glycol chain.

In certain embodiments, the indene-based solvent and the carbon nanotubes are refluxed for a period of time sufficient to achieve functionalization of the carbon nanotubes. In some nonlimiting embodiments, the reactants are refluxed for a period of about 6 to about 12 hours. For example, in some embodiments, the reactants are refluxed for at least about 6, at least about 8, at least about 10, or at least about 12 hours. The extent of the functionalization can be controlled by the duration of the reflux. For example, refluxing less than 6 hours leads to a reduced density of the functionalization on the carbon nanotube surface. Functionalization with indene or indene bearing additional functional groups attached to the six-membered ring can be also conducted in other organic solvents such as toluene or o-dichlorobenzene, not using the indene simultaneously as solvent and reactant. Indene (or functionalized indene)—solvent ratios can range for 5:95 to 100:0 (e.g., where the indene or functionalized indene is the reactant). Reduced indene (or functionalized indene) concentrations will lead to a reduced concentration of the attachment on the CNT surface and longer reaction times will be required.

Functionalization of the carbon nanotubes is assessed by spectroscopy, thermogravimetric analysis (TGA), microscopy (e.g., scanning electron microscopy (SEM) or transmission electron microscopy (TEM), or other suitable methods. Spectroscopic methods include, without limitation, Raman, infrared, and UV-Vis. For example, in one embodiment, functionalization is evaluated via Raman spectroscopy measured with an excitation wavelength of 785 nm, 633 nm or 514 nm (or wavelengths close by). The presence of an enhanced D-band at approximately 1320 to 1350 $cm^{-1}$ is indicative of functionalization. In some embodiments, TGA is performed in an inert gas atmosphere. In TGA, functionalized nanotubes exhibit more weight loss than non-functionalized nanotubes. In other embodiments, surface roughness of the carbon nanotubes, as shown in TEM but also atomic force microscopy, is indicative of functionalization.

In some embodiments, the carbon nanotube starting material is at least about 70% pure, at least about 80% pure, at least about 85% pure, or at least about 95% pure. In other embodiments, the carbon nanotubes are about 70% to about 95% pure. Purity of the carbon nanotube starting material is determined by, for example, thermogravimetric analysis under air. More detailed purity data can be obtained using X-ray photoelectron spectroscopy (XPS), X-ray diffraction (XRD) using internal standards or elemental analysis.

It has been found that the functionalized carbon nanotubes prepared by the disclosed methods exhibit superior dispersibility (e.g., improved solubility) in a range of solvents. Exemplary solvents include, without limitation, propyleneglycol-methyl-ether-acetate (PGMEA), ethanol, tetrahydrofuran (THF), o-dichlorobenzene (ODCB), heptane, hexane, and dichloromethane (DCM). For example, in some embodiments, the functionalized nanotubes are dispersed in solvent at a concentration of about 0.1 mg/mL to about 2 mg/mL. In some embodiments, the functionalized nanotubes are dispersed in solvent at a concentration of about 0.2 mg/mL to about 1 mg/mL or about 0.2 mg/mL to about 0.6 mg/mL. In still further embodiments, the functionalized nanotubes are dispersed in solvent at concentrations of at least about 1.5 mg/mL or greater than about 1.6 mg/mL.

Dispersions of carbon nanotubes are prepared by sonicating a mixture of nanotubes in solvent for a specified period of time. In some embodiments, the mixture is sonicated for 15 minutes, 20 minutes, 45 minutes, or about 60 minutes. In other embodiments, the mixture is sonicated for at least about 1 hour.

In some embodiments, dispersions are allowed to stand for about 10 minutes, about 15 minutes, about 30 minutes or about 45 minutes. In other embodiments dispersions are allowed to stand for at least about 15 minutes, or at least about 45 minutes. Phase separation, or observation of precipitation of the carbon nanotubes is indicative of instability in the materials. Dispersion stability is also assessed by subjecting the well-dispersed material (e.g., that has been subjected to sonication) to centrifugation. In some embodiments, solubility is confirmed by ability to withstand centrifugation (e.g., the material is considered soluble when it does not phase separate during centrifugation). Visual observation of precipitation or phase separation is indicative of an instable or insoluble dispersion. In some embodiment, the dispersion is centrifuged at about 1,000, about 2,000, about 5,000, about 7,500, or about 10,000 rpm. In some embodiments, the dispersions are centrifuged for about 15 minutes, about 20 minutes, about 30 minutes, about 45 minutes or about 60 minutes. In other embodiments, the dispersions are centrifuged for at least about 30 minutes or at least about 60 minutes.

Figure 10:
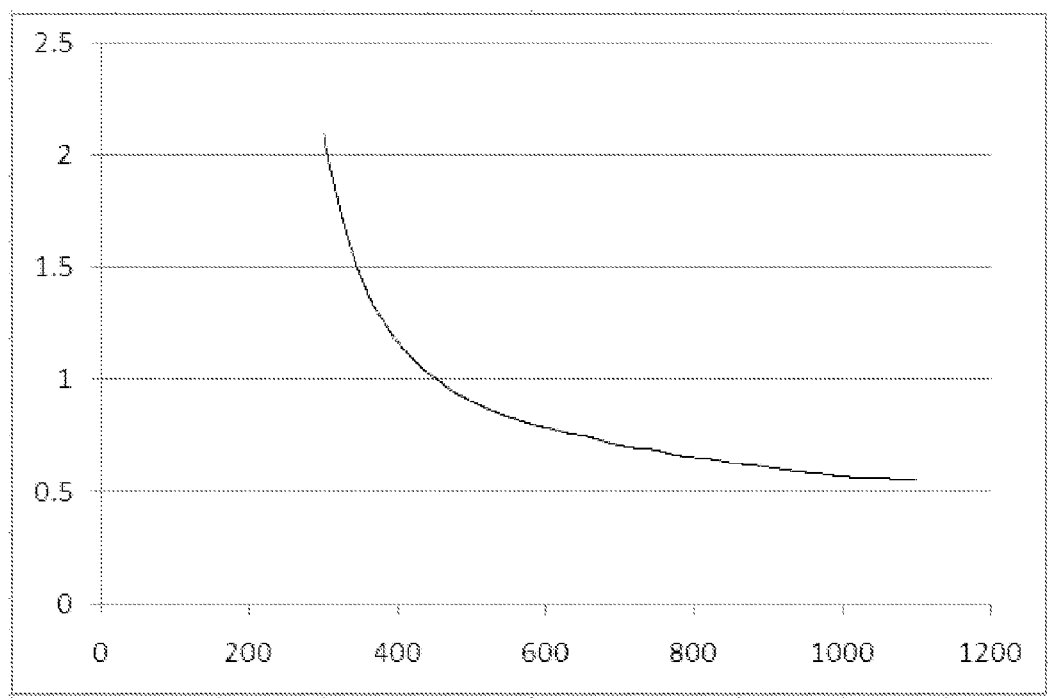
FIG. 10a is a representation of an UV-vis spectrum of dispersions of functionalized purified SWCNT in ethanol, following centrifugation at 5000 rpm.
FIG. 10b is a representation of an UV-vis spectrum of dispersions of functionalized purified SWCNT in PGMEA, following centrifugation at 5000 rpm.
FIG. 10c is a representation of an UV-vis spectrum of dispersions of functionalized purified SWCNT in THF, following centrifugation at 5000 rpm.
FIG. 10d is a representation of an UV-vis spectrum of as-produced SWCNT.
Figure 10:
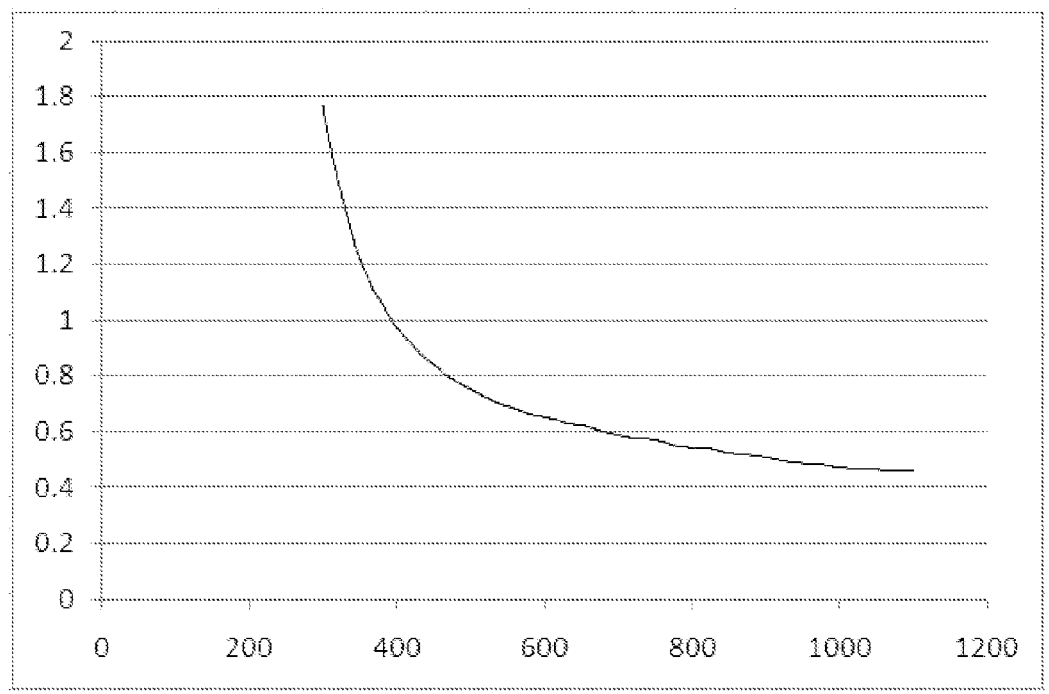
Figure 10:
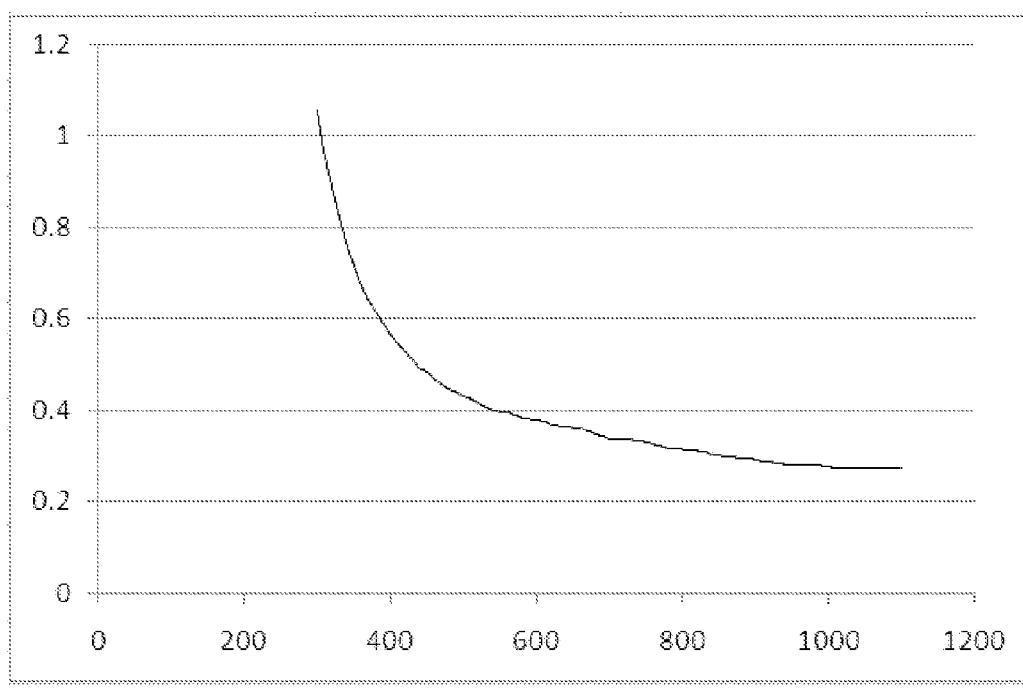
Figure 10:
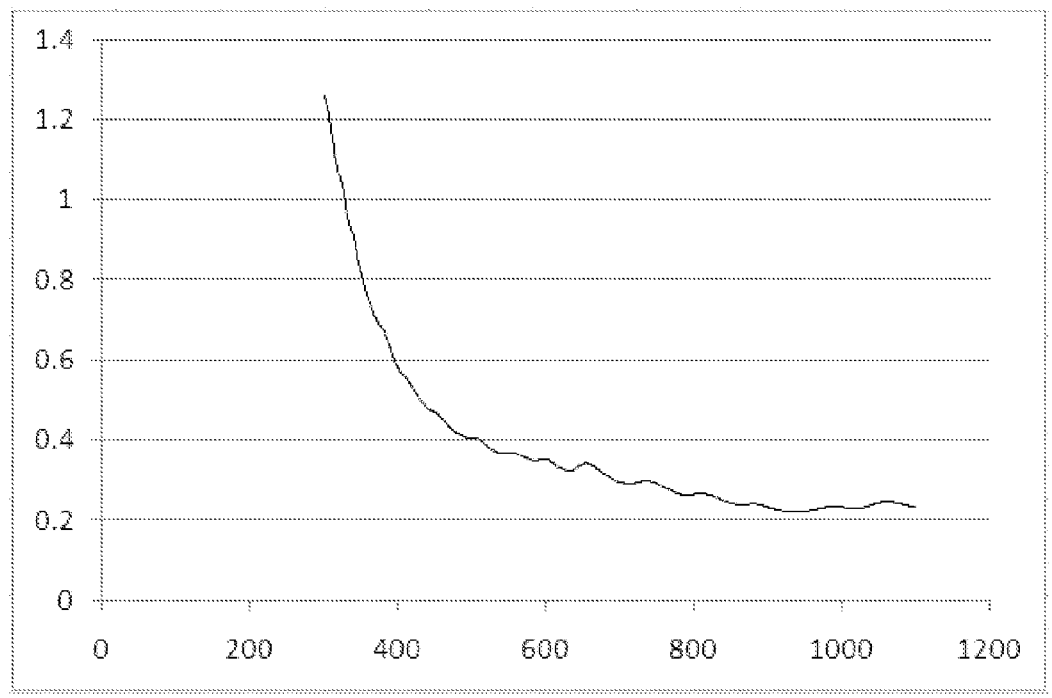

Successful dispersion of the functionalized carbon nanotube in solvent is demonstrated by visual inspection and also by UV-vis spectroscopy (e.g., as shown in FIG. 10 for dispersions prior to further purification). For example, uniform visible density, with no phase separation, is indicative of a well-dispersed product. Dispersions that maintain a lack of phase separation after standing for a specified period of time are considered stable. Moreover, the intensity of the coloration can be used as first approximation for the concentration. Absorption coefficients valid for a given functionalization, wavelengths and a specific solvent can be determined for solutions of known concentration. Such absorption coefficients can be then used for the determination of concentrations by measuring absorbance.

In one embodiment, functionalization of the carbon nanotubes is reversed following dispersion of the nanotubes in solvent and application of the dispersed nanotubes onto a substrate, for example to form a carbon nanotube film. For example, in some embodiments, de-functionalization is accomplished by application of heat to the applied nanotube dispersion. In one specific embodiment, functionalized carbon nanotubes are used for the preparation of a transparent conducting film. Once the nanotube solution has been deposited, either alone or mixed, e.g., with a polymer solution, it is heated to a temperature that can range from about 40° C. to about 400° C., at a pressure ranging from about $10^{-6}$ torr to about 1 atmosphere. In one embodiment, the deposited nanotube is heated to greater than about 120° C., at atmospheric pressure. In some embodiments, the applied material is heated to a temperature about the boiling temperature of the functionalization reactant (e.g., indene). It is theorized that this heating with or without pressure reverses the functionalization of the nanotubes, thereby restoring the desired high electrical conductivity of the nanotube-containing thin films. If defunctionalization is conducted in an inert atmosphere, annealing leads to further improvement of the conductivity. In some embodiments, annealing is achieved by heating to temperatures of ≥about 400° C.

Spectra of dispersions of functionalized carbon nanotubes in both PGMEA and THF exhibit absorption bands in the 500 to 900 nm range (e.g., FIGS. 10*a*-*c*). These absorption bands are comparable to the absorptions bands observed unfunctionalized as-produced material (FIG. 10*d*). The reduced resolution of the absorption bands is likely related to higher concentrations and therefore, to reduced exfoliation and, in some circumstances partial bundling. The absence of pronounced features at lower wave numbers is consistent with the partial suppression of metallic properties due to functionalization. The latter observation is confirmed by a 10 to 30-fold higher resistivity of films obtained after filtration of functionalized carbon nanotubes dispersed in either ethanol, PGMEA or THF in comparison to that prepared from an ODCB dispersion of as-produced carbon nanotubes. While such increase in resistivity is likely to increase the on/off ratio in thin-film transistor applications, the reversibility of the functionalization when heating, as indicated by TGA under nitrogen (see, e.g., FIG. 6), is expected to allow for full restoration of conductivity as desirable for conducting film applications.

In one aspect, separation of functionalized carbon nanotubes from the reaction mixture is achieved via an extraction or leaching method. For example, in one nonlimiting embodiment, separation is achieved via solid-liquid extraction. In another nonlimiting embodiment, separation is achieved via liquid-liquid extraction. In one embodiment, separation is achieved via Soxhlet extraction.

In another aspect, functionalization of the carbon nanotubes allows for differentiation between of a population carbon nanotubes that includes different electronic properties, such as semiconducting nanotubes and metallic nanotube. For example, in one embodiment, a population of carbon nanotubes having different electronic properties is provided (e.g., metallic nanotubes and semiconductive nanotubes). One of these types of nanotubes is selectively functionalized with the indene-based reactant (or other functional reactant as described herein). In one embodiment, varying the temperature of the reaction provides for differentiation between types of carbon nanotubes. In another embodiment, the duration of the reaction controls differentiation between types of carbon nanotubes. In a further embodiment, concentration of the functionalized reactant controls differentiation between types of carbon nanotubes. In yet more embodiments, temperature, reaction duration and/or reactant concentration are modified to achieve differentiation between types of carbon nanotubes. Thus, the functionalization methods disclosed herein provide a method by which to chemically differentiate nanotubes, thereby allowing for the enrichment or bulk separation of the nanotube population into two different electronic types. In further embodiments, differentiation is achieved via solid-liquid extraction or leaching method (e.g., Soxhlet extraction) for the solubilization of functionalized carbon nanotubes in the reactant. In another embodiment, separation is achieved via liquid-liquid extraction for the solubilization of functionalized carbon nanotubes prepared.

In further embodiments, a solid-liquid extraction or leaching method (e.g., Soxhlet extraction) is provided. The solid-liquid extraction or leaching method exploits the chemical differentiation that is created when one group of carbon nanotubes is selectively functionalized. The selectively functionalized nanotube is selectively leached or extracted away leading to the enrichment or bulk separation of the tube types into two different populations based on their electronic structure. In other embodiments, a similar extraction of leaching method is provided, wherein the method is a liquid-liquid extraction method

EXAMPLES

Example 1

Figure 2:
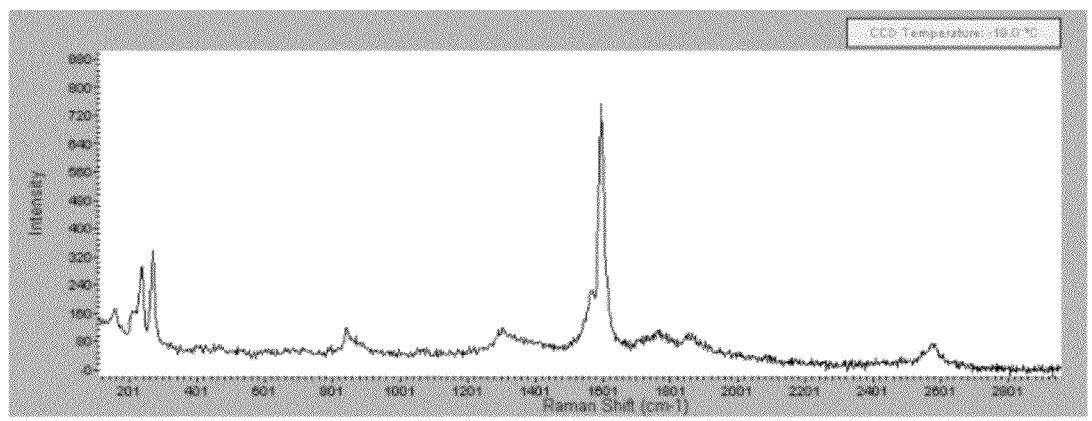
FIG. 2 is a representation of a Raman spectrum of as-produced SWCNT prior to functionalization as described in Example 1, produced with an excitation wavelength of 785 nm. as used for functionalization.

110 mg of as-produced single-wall carbon nanotube ("SWCNT") (Nano-C, Inc., 70% purity with the remainder being mainly iron and iron oxide) have been refluxed overnight in 250 ml, of indene (90%, Alfa Aesar). After evaporation of the liquid under vacuum (using a "rotavap"), a viscous residue remained. Toluene was added and the solid product was filtered through a 0.2 μm PTFE membrane (Pall TF-200). The resulting product was washed with toluene and methanol and then vacuum-dried overnight at 60° C. FIG. 1 depicts a Raman spectrum of the resulting product, measured with an excitation wavelength of 785 nm. FIG. 2 depicts a Raman spectrum of the starting material, produced under similar conditions. Comparing FIG. 1 with FIG. 2, an enhanced D-band around 1320 cm$^{-1}$ in the reaction product (FIG. 1) indicates the attachment of functional groups whereas the radial breathing modes between approximately 190 and 300 cm$^{-1}$ are consistent with the presence of intact SWCNT.

Example 2

Solubility in o-dichlorobenzene (ODCB) was assessed. For this purpose, 5.8 mg of the SWCNT functionalized in Example 1 were added to 10 mL of ODCB and treated for one hour in a Branson 2210 sonication bath. A dispersion stable (i.e., no visible precipitation occurred) for several days resulted. Subsequently, a $10^{-2}$ wt % solution was prepared by diluting 1 mL of this dispersion with 3.4 mL of ODCB. The final $10^{-2}$ wt % solution/dispersion was centrifuged sequentially for 30 min, respectively, at 2500 and 5000 rpm in a Beckmann L8-80 ultracentrifuge without visible precipitation.

Example 3

Solubility in toluene was also assessed. In this example, 3.80 mg of the functionalized SWCNT were dispersed in 10 mL of toluene, again treated with 60 minutes sonication in a Branson 2210 apparatus. After some time, small particles became visible but precipitation did not occur during several days, providing additional evidence for improved dispersibility of indene-functionalized in comparison to comparison to unfunctionalized SWCNT.

Example 4

Figure 3:
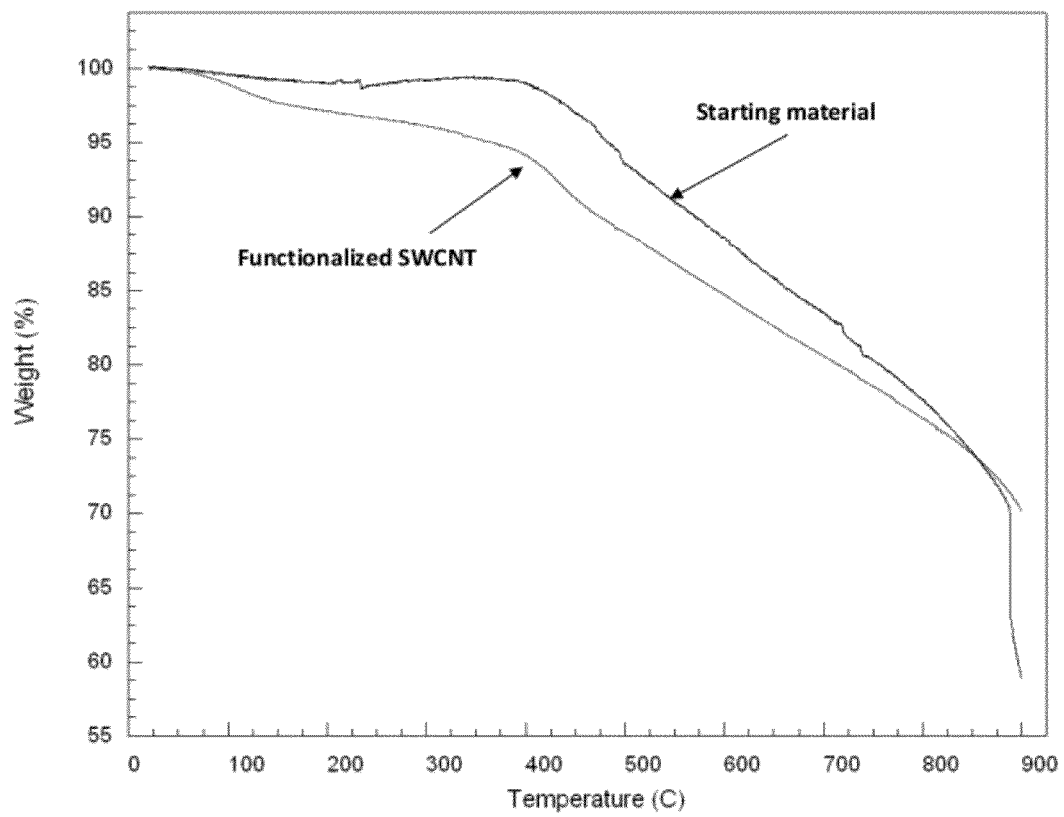
FIG. 3 is a representation of a thermogram of functionalized as-produced SWCNT, overlaid with a thermogram of the corresponding starting material (unfunctionalized), depicting thermogravimetric analysis (TGA) under nitrogen at a heating rate of 7.5 K/min for both materials.
Figure 4:
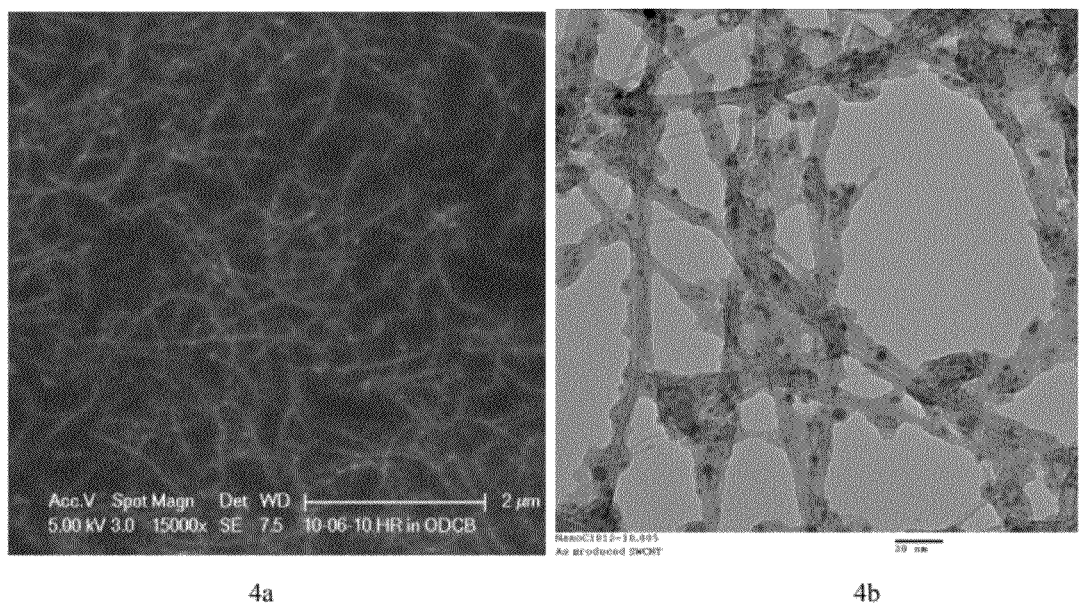
FIG. 4a is a photomicrograph image of indene-functionalized as-produced SWCNT, using a scanning electron microscope (SEM).
FIG. 4b is a photomicrograph image of indene-functionalized as-produced SWCNT, using a transmission electron microscope (TEM).

534 mg of as-produced SWCNT (Nano-C, Inc., 70% purity) were refluxed overnight under argon in 400 mL of indene (90%, Alfa Aesar) using a 1-liter three-neck flat bottom flask. After cooling, the resulting mixture was transferred to a two-liter one-neck flat bottom flask. The liquid was evaporated under vacuum ("rotavap"), and a viscous residue remained. Toluene was added and the solid material filtered through a 0.2 μm PTFE membrane (Pall TF-200). The remaining solid was washed with toluene and methanol, followed by vacuum-drying overnight at 60° C. 500.3 mg of powder were collected. The product was characterized in some detail by means of Raman spectroscopy (resulting in a spectrum similar to that of the material described in Example 1), thermogravimetric analysis (TGA) under air (not shown) and inert gas atmosphere, UV-vis spectroscopy, scanning as well as transmission electron microscopy (SEM and TEM). FIG. 3 depicts a comparison of TGA under nitrogen of functionalized SWCNT with the starting material and shows a significantly more pronounced weight loss of the indene-functionalized SWCNT reflecting at least some reversibility of the Diels-Alder reaction. The weight loss of the starting material (and correspondingly partially of the functionalized SWCNT) is thought to be due to some residual air leaking into the system. FIGS. 4a and 4b depict examples of SEM (FIG. 4a) and TEM (FIG. 4b) images of the resulting product, confirming the presence of SWCNT. Without wishing to be bound by a particular theory, it is theorized that surface roughness, particularly seen with TEM (FIG. 4b) is caused by functionalization. The assessment of dispersibility resulted, in a stable dispersion in ODCB, consistent with Example 1.

Example 5

380 mg of purified SWCNT (Nano-C, Inc., 98% purity) were refluxed overnight under argon in 500 mL of indene (90%, Alfa Aesar) using a 1-liter three-neck flat bottom flask. After cooling, the liquid was evaporated under vacuum (using a "rotavap"). Toluene was added and the solid material filtered through a 0.2 μm PTFE membrane (Pall TF-200). The remaining solid was washed with toluene and methanol, followed by vacuum-drying overnight at 60° C. 379.1 mg of powder were collected and characterized in detail.

Figure 5:
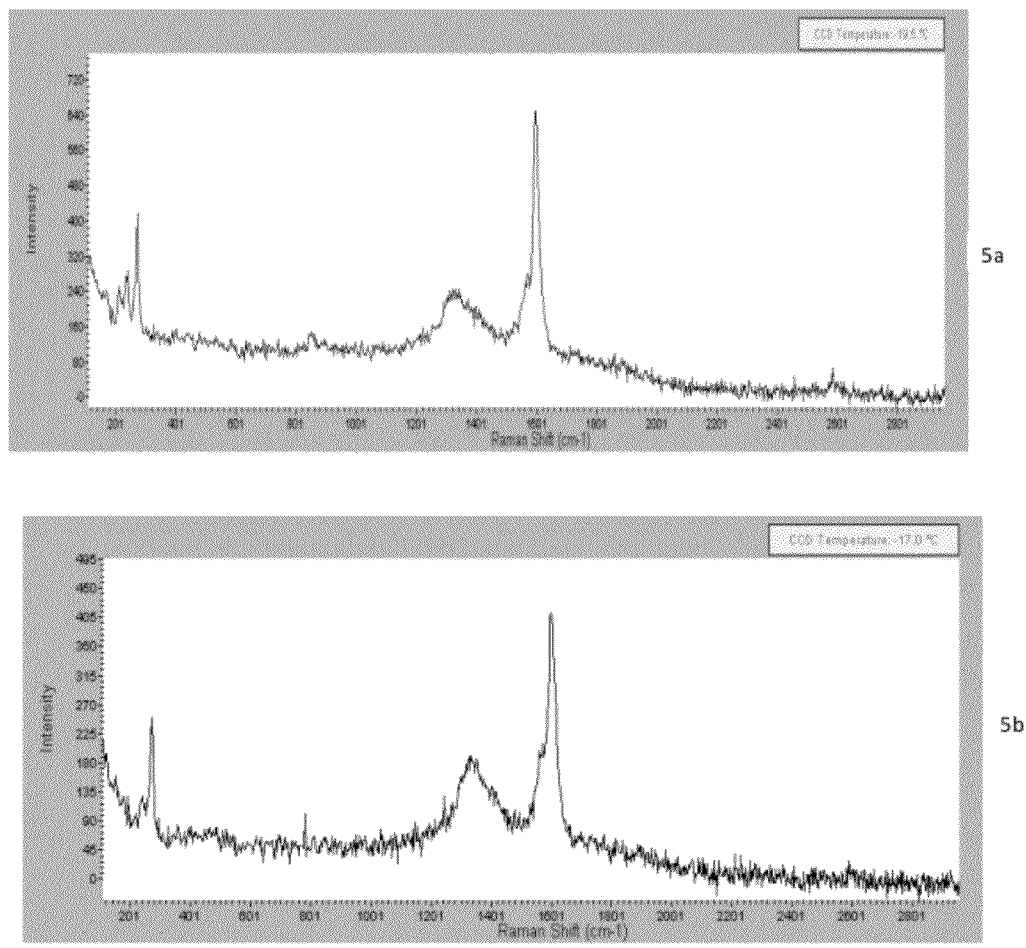
FIG. 5a is a representation of a Raman spectrum of functionalized purified SWCNT at an excitation wavelength of 785 nm.
FIG. 5b is a representation of a Raman spectrum of SWCNT starting material (unfunctionalized), at an excitation wavelength of 785 nm.
Figure 6:
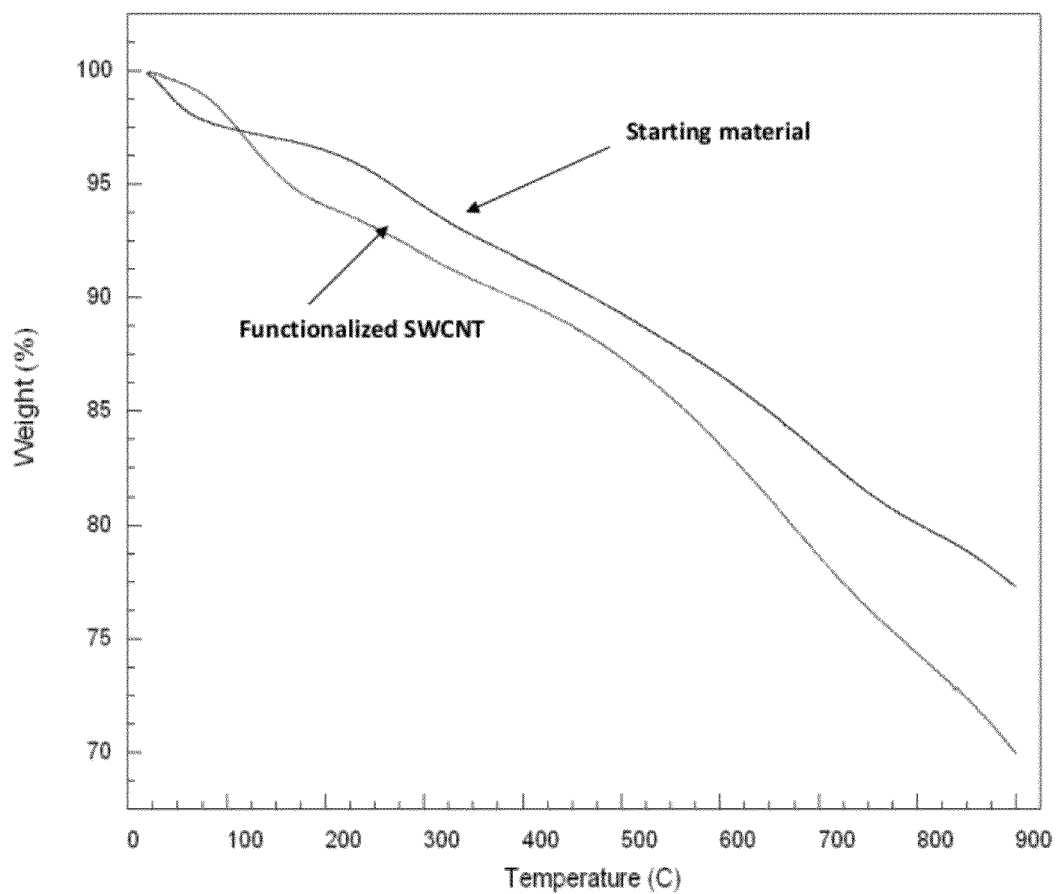
FIG. 6 is a representation of a thermogram of functionalized purified SWCNT overlaid with a thermogram of the corresponding starting material (unfunctionalized), depicting thermogravimetric analysis (TGA) under nitrogen at a heating rate of 7.5 K/min for both materials.

The Raman spectrum of the functionalized SWCNT in comparison to the starting material (purified SWCNT) is given in FIGS. 5a and 5b. FIG. 5a, depicting the functionalized material, exhibits a reduced D/G-band ration relative to the as-produced SWCNT shown in FIG. 5b. This observation may be related to preferential reaction of the functionalization agent with SWCNT which bear fewer —COOH groups (introduced during the purification procedure). Thermogravimetric analysis (TGA) under inert gas (nitrogen), shown in FIG. 6, provided evidence of successful functionalization. The TGA curve shown in FIG. 6 indicates functionalized SWCNT exhibits a significantly more pronounced weight loss than regular purified SWCNT reflecting at least some reversibility of the addition reaction. This effect is similar to the effect shown in the TGA curve of as-produced material depicted in FIG. 3.

Figure 7:
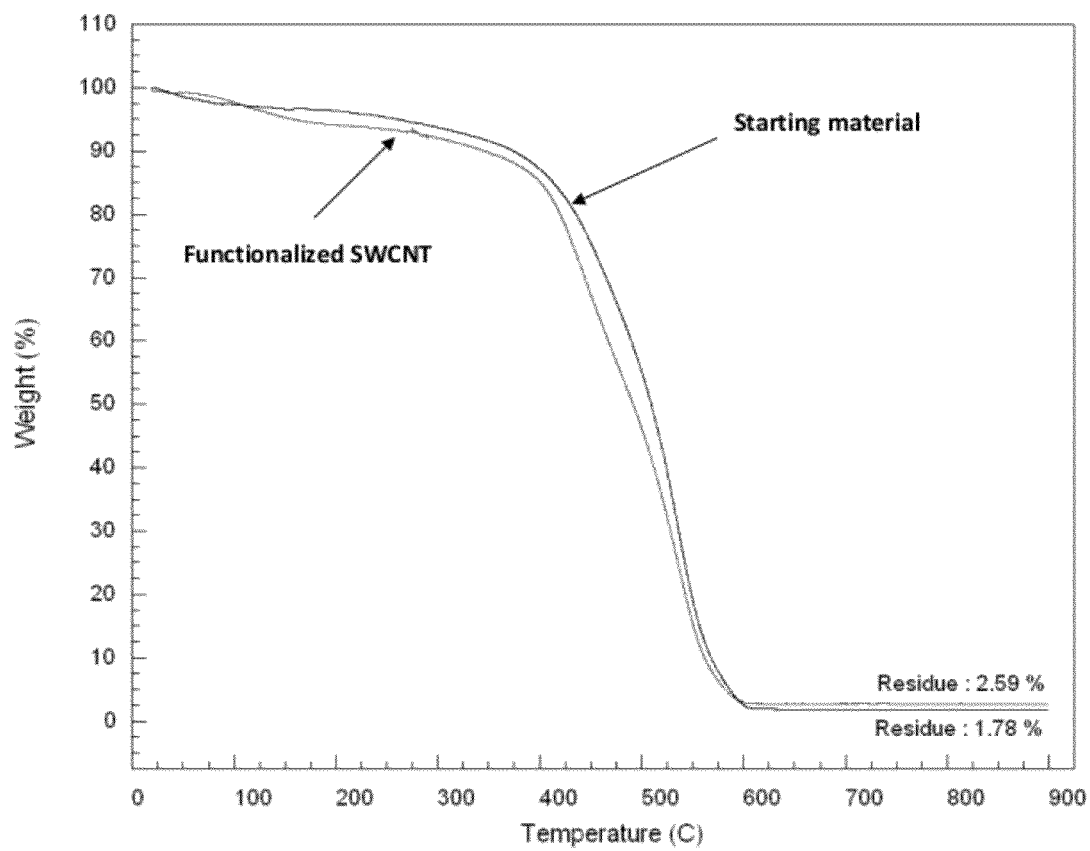
FIG. 7 is a representation of a thermogram of functionalized purified SWCNT overlaid with a thermogram of the corresponding starting material (unfunctionalized), depicting thermogravimetric analysis (TGA) under air at a heating rate of 7.5 K/min for both materials.

Again, some weight loss for both samples needs to be assigned to oxidation due to the intake of small amounts of air. In addition, TGA under air was performed (FIG. 7). Comparison of the oxidative degradation of purified SWCNT (the starting material) and the final functionalized SWNT shows only a minor (if any) effect on the stability of the SWCNT as at least some of the faster weight loss of the functionalized SWCNT is probably due the reversibility of the functionalization reaction.

Figure 8:
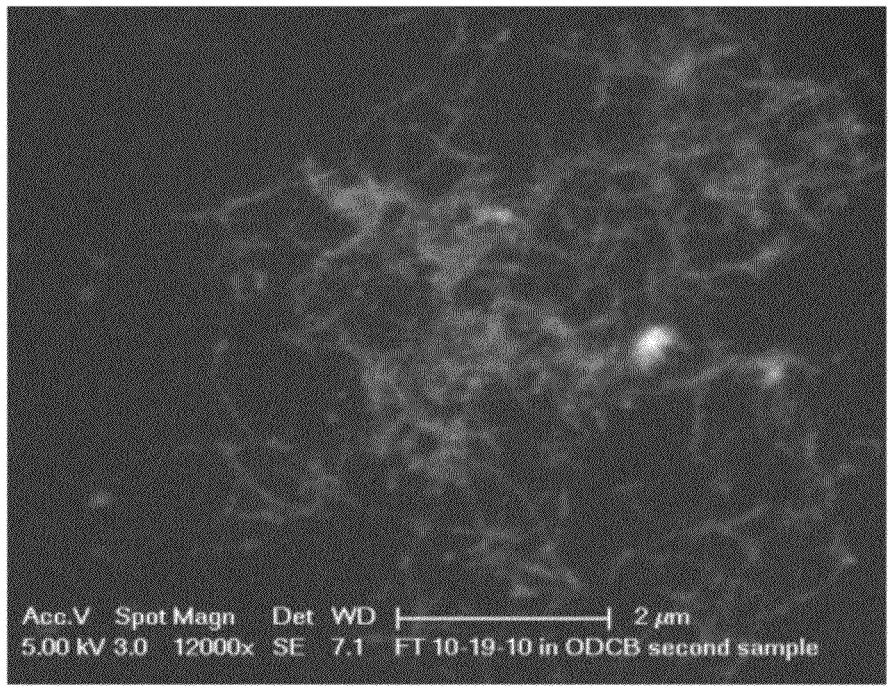
FIG. 8a is a photomicrograph image of indene-functionalized purified SWCNT, using a scanning electron microscope (SEM).
FIG. 8b is a photomicrograph image of indene-functionalized purified SWCNT, using a transmission electron microscope (TEM).
Figure 8:
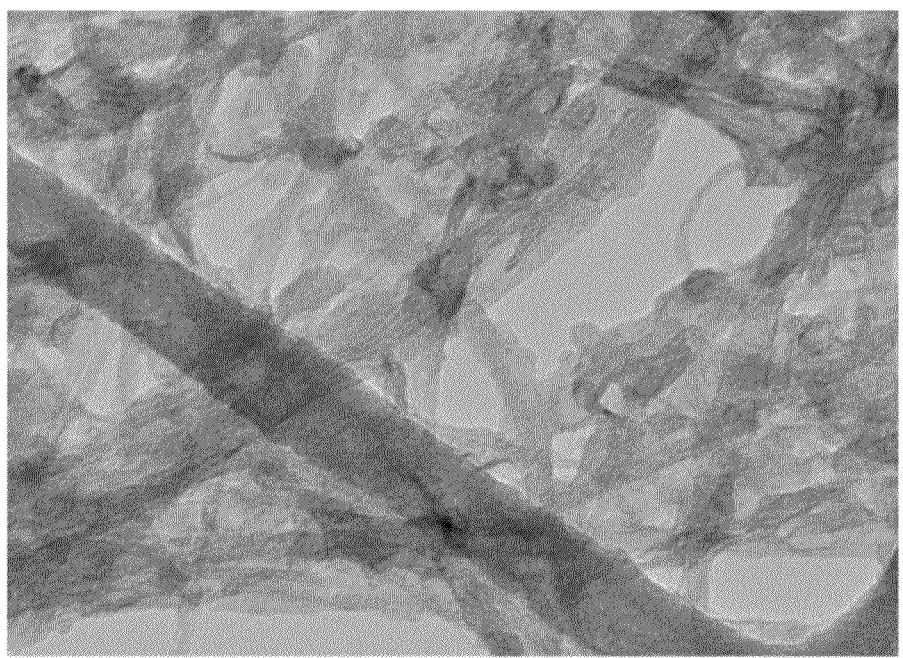

Assuming that all residue consisted of Fe which was oxidized to $Fe_2O_3$ during the TGA run, the abundance of carbonaceous material in the reaction product is 98.2% and 98.8% for functionalized and unfunctionalized SWCNT, respectively. Scanning electron microscopy (SEM) and a transmission electron microscopy (TEM) images of functionalized purified SWCNT after deposition on carbon film as well as a holey carbon grid, respectively, are given in FIGS. 8a and 8b.

Figure 9:
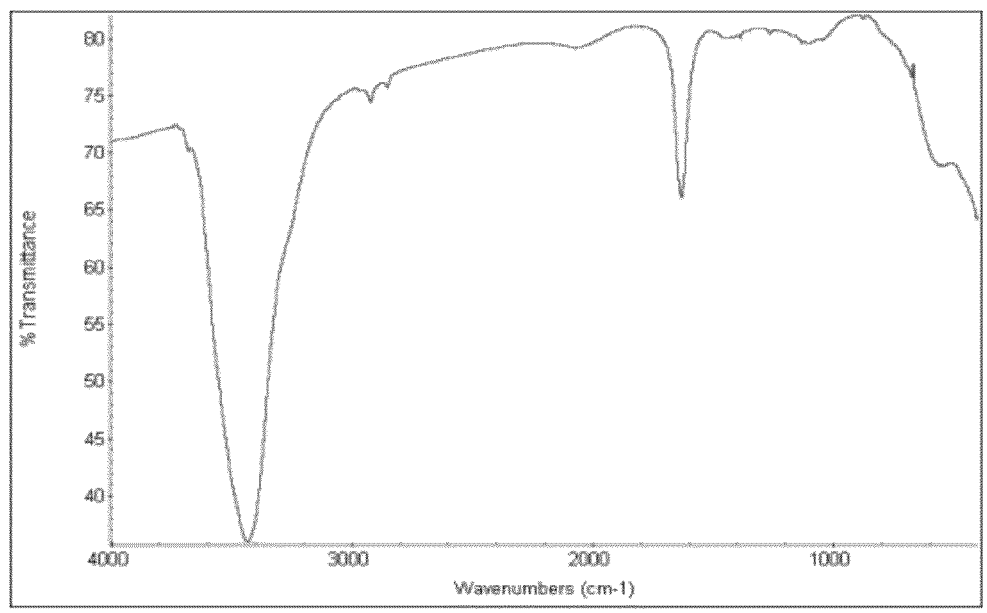
FIG. 9a is a representation of an infrared spectrum of functionalized purified SWCNT.
FIG. 9b is a representation of an infrared spectrum of purified SWCNT prior to functionalization.
Figure 9:
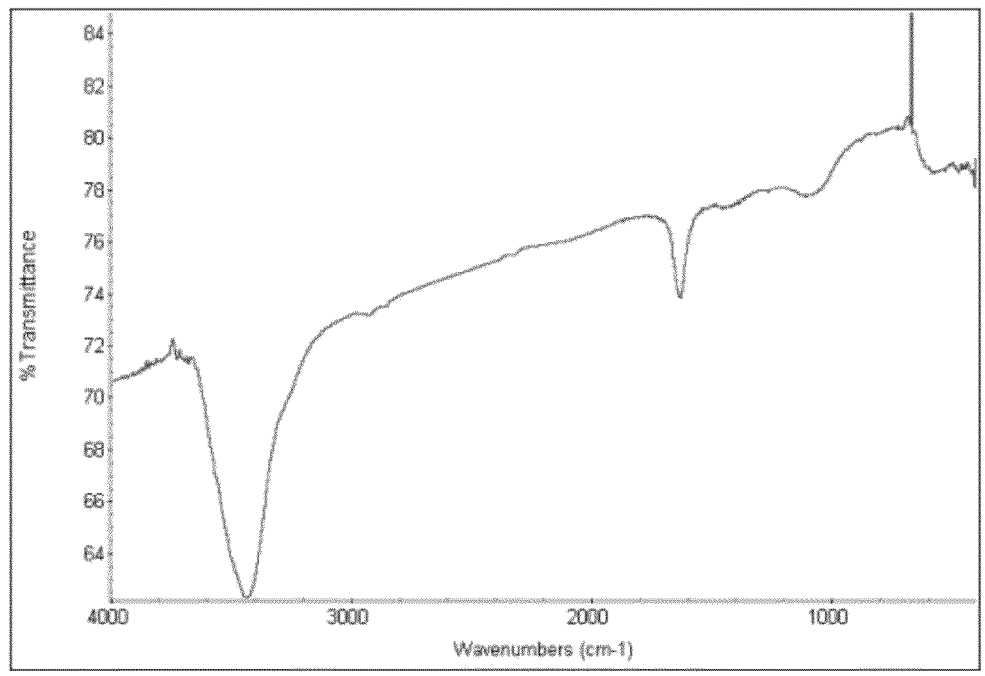

Infrared spectra (FT-IR) of the functionalized purified SWCNT were measured in comparison to the corresponding starting material. As it can be seen in FIGS. 9a and 9b, —OH stretches of carboxyl acid groups (e.g. around about 3200 to about 3500 $cm^{-1}$) (introduced during the purification of the starting material) are present in both cases. C—C=C stretches around 1600 to 1500 $cm^{-1}$, characteristic for aromatic systems, are also observed. H—C—H asymmetric and symmetric stretches (about 3000 to about 2800 $cm^{-1}$) and H—C—H bends (about 1500 to about 1440 $cm^{-1}$) of alkanes appear to be more prominent in the case of the functionalized SWCNT (FIG. 9a). In conclusion, FIGS. 9a and 9b confirm that SWCNT remain intact and are indicative of functionalization.

Example 6

Figure 11:
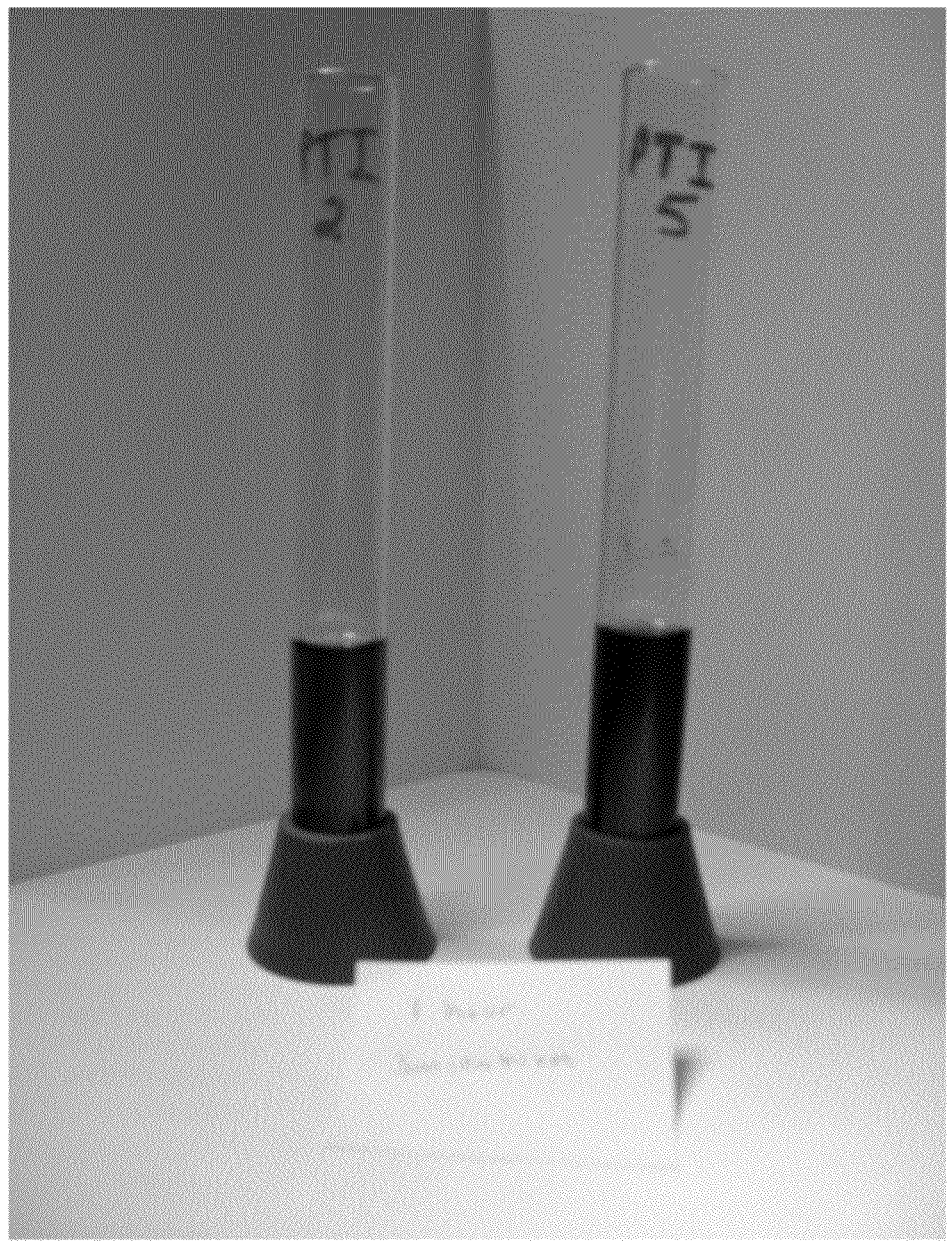
FIG. 11 is a photographic depiction of functionalized purified SWCNT dispersed in THF at two different concentrations: 0.2 mg/mL (left test tube) and 0.5 mg/mL (right test tube).
Figure 12:
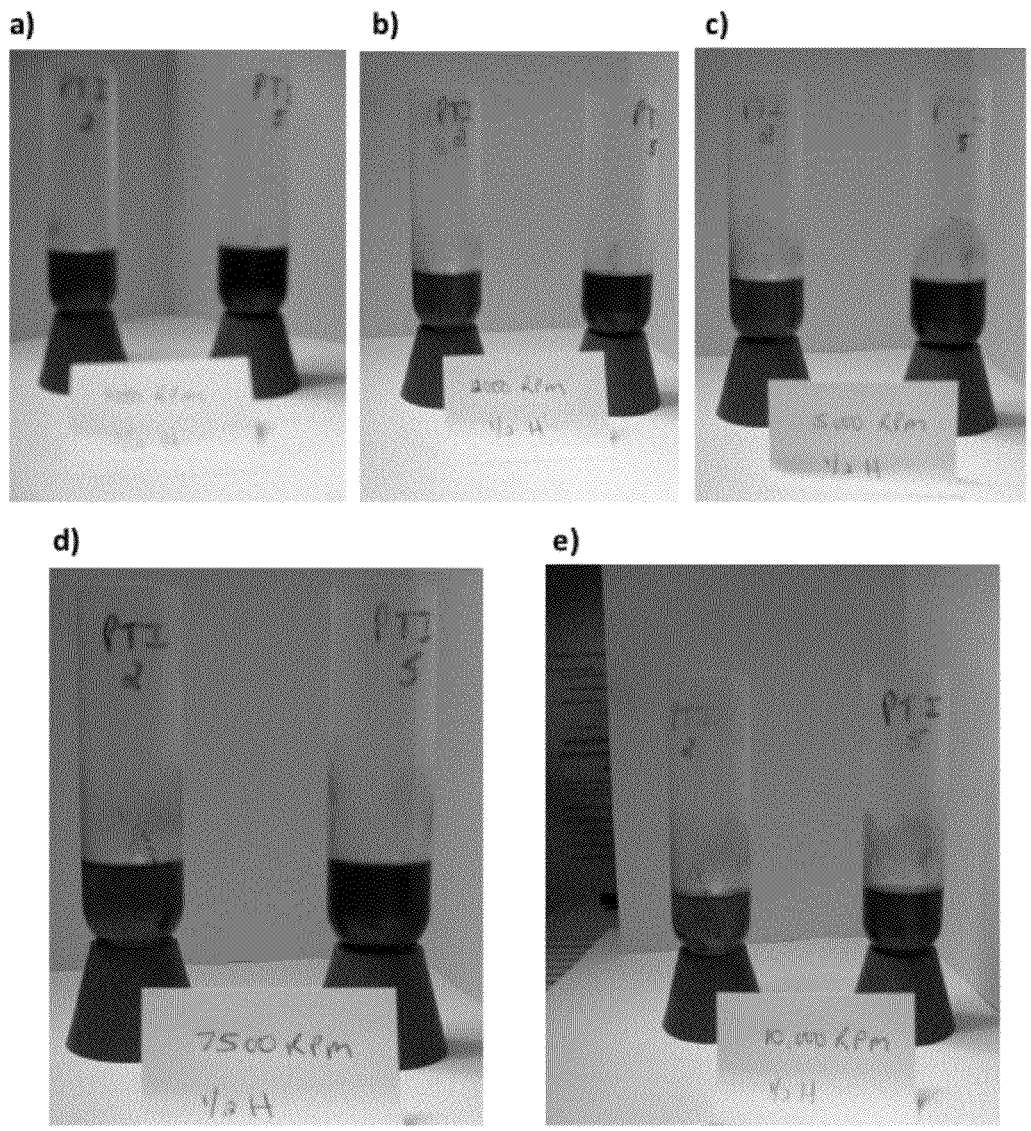
FIG. 12a is a photographic depiction of functionalized purified SWCNT dispersed in THF following centrifugation at 1000 rpm, at two different concentrations: 0.2 mg/mL (left test tube) and 0.5 mg/mL (right test tube).
FIG. 12b is a photographic depiction of functionalized purified SWCNT dispersed in THF following centrifugation at 2000 rpm, at two different concentrations: 0.2 mg/mL (left test tube) and 0.5 mg/mL (right test tube).
FIG. 12c is a photographic depiction of functionalized purified SWCNT dispersed in THF following centrifugation at 5000 rpm, at two different concentrations: 0.2 mg/mL (left test tube) and 0.5 mg/mL (right test tube).
FIG. 12d is a photographic depiction of functionalized purified SWCNT dispersed in THF following centrifugation at 7500 rpm, at two different concentrations: 0.2 mg/mL (left test tube) and 0.5 mg/mL (right test tube).

To determine if the degree of functionalization is related to the dispersability of the nanotubes, two samples of functionalized purified SWCNT in THF were prepared containing 2 mg and 5 mg in 10 mL THF, respectively. The samples were prepared in parallel by 1 h treatment in a Branson 2210 sonication bath. Pictures of both dispersions are given in FIG. 11. The stability of these dispersions was assessed by sequential centrifugation at 1000, 2000, 5000, 7500 and 10,000 rpm for 30 min, respectively, using again a Beckmann L8-80 ultracentrifuge. Corresponding pictures, comparing dispersions with initial concentrations of 0.2 and 0.5 mg/mL are shown in FIGS. 12a-12e. While it can be observed that with continued centrifugation at increasing speed, both dispersions become progressively clearer, the one with the initially higher concentrations (0.5 mg/mL) remains darker (e.g., see FIG. 12e, right test tube). This finding indicates that despite the appearance of some precipitation with an initial concentration of 0.2 mg/mL, no saturation with highly functionalized SWCNT has occurred.

Example 7

Figure 13:
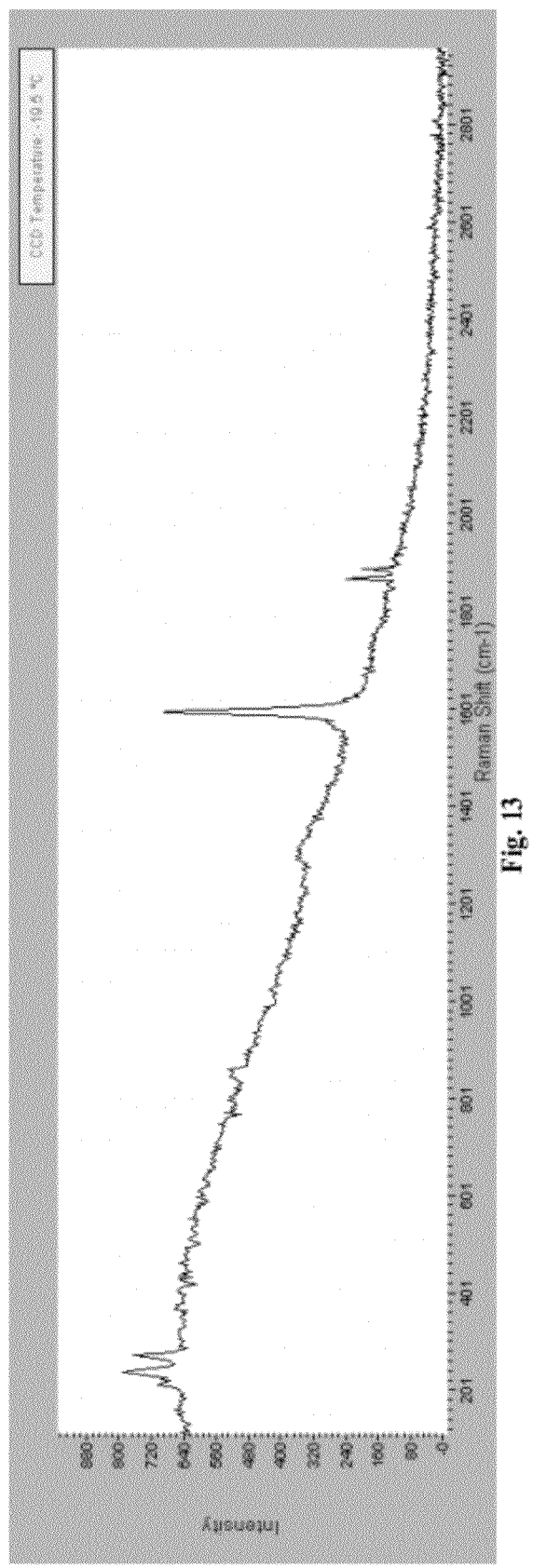
FIG. 13 is a representation of a Raman spectrum, produced with an excitation wavelength of 785 nm, of functionalized purified SWCNT, following further purification by recrystallization in THF.
Figure 14:
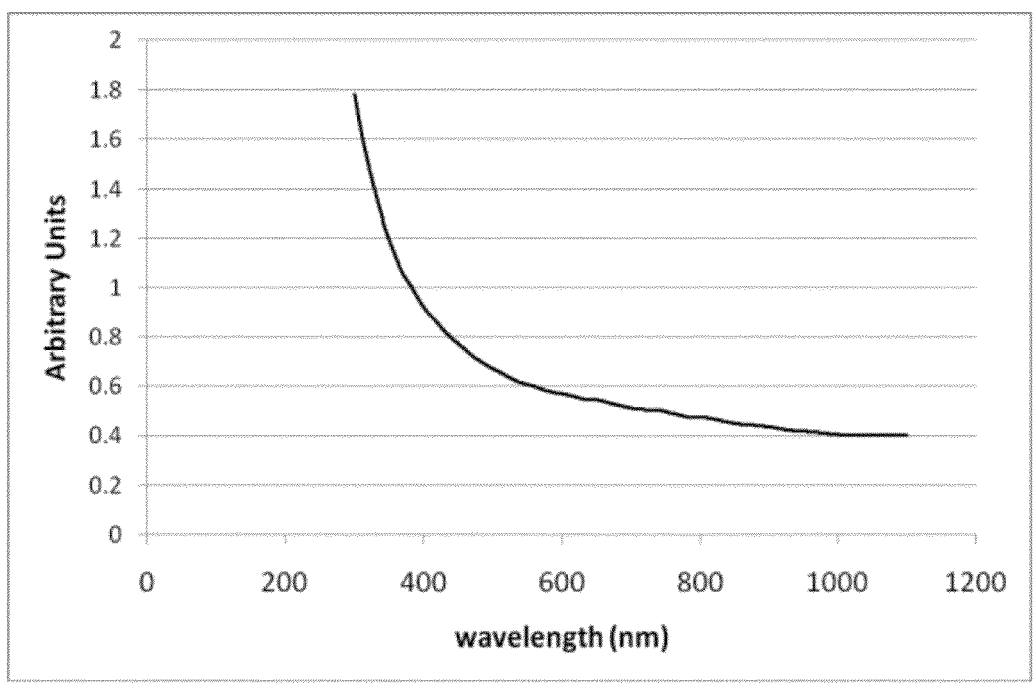
FIG. 14 is a representation of a UV-vis spectrum of functionalized purified SWCNT, following further purification by recrystallization in THF.

In the next step, solubilization (recrystallization) of functionalized SWCNT in THF is used for purification. 160 mg of functionalized purified SWCNT was dispersed in 160 mL of THF assisted by 1 h sonication, followed by 1 h centrifugation at 10,000 rpm. The supernatant liquid is removed with a pipette and the solvent allowed to dry. 33 mg of purified indene functionalized SWCNT have been recovered. Corresponding Raman and UV-vis spectra are given in FIGS. 13 and 14 confirming the presence of SWCNT. Only assisted by short sonication (10 to 15 s) in the Branson 2210 sonication bath, the 33 mg of purified functionalized SWCNT could be redispersed in 20 mL of THF leading to a solution with a concentration of 1.65 mg/mL.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. A method of preparing functionalized carbon nanotubes, comprising:
    heating a carbon nanotube in a solvent comprising an optionally substituted polycyclic aromatic compound in the absence of externally applied microwaves, to obtain an adduct comprising the polycyclic aromatic moiety bound to the wall of the carbon nanotube;
    wherein the optionally substituted polycyclic aromatic compound is an optionally substituted indene-based compound.

2. The method of claim 1, wherein the solvent is the indene-based compound.

3. The method of claim 1, wherein the optionally substituted indene-based compound comprises one or more functional groups selected from the group consisting of $C_1$-$C_{12}$ alkyl, $C_3$-$C_{12}$ alkenyl, $C_1$-$C_{12}$ alcohol, halogen, metal halide, carboxylic acid, ester, ether, polyethyleneglycol, —$NH_2$, NHR, —CONH, —$SO_3H$, ketone, aldehyde, optionally substituted phenyl, optionally substituted benzyl, and mixtures thereof,
    wherein R is $C_1$-$C_{12}$ alkyl, $C_3$-$C_{12}$ alkenyl, halogen, or a mixture thereof, or
    wherein the optionally substituted indene-based compound is fused with one or more additional aromatic rings.

4. The method of claim 1, wherein the heating step comprises refluxing the carbon nanotube in the solvent or melting the carbon nanotube in the solvent.

5. The method of claim 1, wherein the carbon nanotubes comprise single-walled carbon nanotubes.

6. The method of claim 1, wherein the carbon nanotubes are purified prior to reaction.

7. The method of claim 6, wherein the carbon nanotubes are greater than 95% pure.

8. The method of claim 1, wherein the carbon nanotube is at least 70% pure.

9. A stable carbon nanotube dispersion, comprising a population of functionalized carbon nanotubes functionalized by a functional group wherein said functional group comprises an optionally-substituted indene-based moiety bound to the wall of the carbon nanotubes; and a solvent.

10. The stable carbon nanotube dispersion of claim 9, wherein the solvent comprises water, THF, PGMEA, alcohol, hexane, benzene, toluene, xylenes, chlorobenzene, or mixtures thereof 11. The stable carbon nanotube dispersion of claim 9 comprising single-walled carbon nanotubes.

12. The stable carbon nanotube dispersion of claim 9, wherein the carbon nanotube content is greater than 1.5 mg/mL.

13. The carbon nanotube dispersion of claim 12, wherein the carbon nanotube content is greater than 1.6 mg/mL.

14. A method of preparing the stable carbon nanotube dispersion of claim 9, comprising:
    providing a population of the functionalized carbon nanotubes wherein said functional group comprises an optionally-substituted indene-based moiety bound to the wall of the carbon nanotubes; and
    dispersing the population of carbon nanotubes in a solvent comprising water, THF, PGMEA, alcohol, hexane, benzene, toluene, xylenes, chlorobenzene, or mixtures thereof.

15. A functionalized carbon nanotube comprising a carbon nanotube and at least one indene-based functional group covalently bound to the wall of the carbon nanotube.

16. The functionalized carbon nanotube of claim 15, wherein the at least one indene-based functional group is optionally substituted with up to four chemical moieties covalently bound to the six-membered ring of the indene-based functional group.

17. The functionalized carbon nanotube of claim 16, wherein the chemical moieties independently comprise $C_1$-$C_{12}$ alkyl, $C_3$-$C_{12}$ alkenyl, $C_1$-$C_{12}$ alcohol, halogen, metal halide, carboxylic acid, ester, ether, polyethyleneglycol, —$NH_2$, NHR, —CONH, —$SO_3H$, ketone, aldehyde, optionally substituted phenyl, optionally substituted benzyl, and mixtures thereof, wherein R is $C_1$-$C_{12}$ alkyl, $C_3$-$C_{12}$ alkenyl, halogen, or a mixture thereof.

18. The functionalized carbon nanotube of claim 15, wherein the carbon nanotube is single-walled.

19. The functionalized carbon nanotube of claim 15, prepared by:

refluxing a carbon nanotube in an indene-based solvent in the absence of externally applied microwaves to obtain an adduct comprising the indene based solvent bound to the carbon nanotube.

* * * * *